US007908718B2

(12) United States Patent
Glasser

(10) Patent No.: US 7,908,718 B2
(45) Date of Patent: Mar. 22, 2011

(54) MULTI-ITEM HOLDER DEVICE AND SYSTEM

(76) Inventor: Jerome Glasser, Maplewood, NJ (US)

( * ) Notice: Subject to any disclaimer, the term of this patent is extended or adjusted under 35 U.S.C. 154(b) by 0 days.

(21) Appl. No.: 10/715,669

(22) Filed: Nov. 18, 2003

(65) Prior Publication Data

US 2005/0102804 A1 May 19, 2005

(51) Int. Cl.
*A44B 99/00* (2010.01)
*F16B 7/04* (2006.01)

(52) U.S. Cl. .............. 24/336; 24/335; 24/545; 403/170; 403/174; 446/111

(58) Field of Classification Search .................... 24/335, 24/336, 67.3, 67.9, 67 CF; 403/169, 170, 403/174, 178, 202, 203; 40/605, 617, 658, 40/609, 733, 731, 730, 729, 790, 784, 785, 40/606.17, 661.05, 666; 446/111, 112; 211/89.01
See application file for complete search history.

(56) References Cited

U.S. PATENT DOCUMENTS

| | | | | |
|---|---|---|---|---|
| 487,959 | A * | 12/1892 | McDonald | 24/67.9 |
| 1,294,954 | A * | 2/1919 | Sampson | 24/336 |
| 2,742,911 | A * | 4/1956 | Bonnett | 24/336 |
| 4,365,454 | A * | 12/1982 | Davis | 52/578 |
| 4,793,725 | A * | 12/1988 | Cheng | 403/174 |
| 4,947,524 | A * | 8/1990 | Chang | 24/67.9 |
| 5,121,526 | A * | 6/1992 | Burkard et al. | 24/336 |
| 5,473,796 | A * | 12/1995 | Fusillo | 24/30.5 R |
| 5,494,178 | A * | 2/1996 | Maharg | 211/189 |
| 5,697,131 | A * | 12/1997 | Hunt et al. | 24/336 |
| 6,018,849 | A * | 2/2000 | Royer | 24/67 CF |
| 6,457,218 | B1 * | 10/2002 | Lawrence | 24/67.9 |
| 6,718,709 | B2 * | 4/2004 | Koutras et al. | 40/605 |

* cited by examiner

*Primary Examiner* — Robert J Sandy

(57) ABSTRACT

Inexpensively manufactured device and system permits the holding, typically for display purposes, of at least one, but preferrably multiple items such as a trading cards or photographs in a manner offering an unobstructed view of the items.

4 Claims, 13 Drawing Sheets

MULTI-ITEM HOLDER DEVICE AND SYSTEM

FIELD OF THE INVENTION

This invention relates to devices for displaying essentially flat, relatively lightweight photographs, cards, artwork, electronic screens, and/or decorative items.

BACKGROUND OF THE INVENTION

Collecting has become an ingrained part of the American culture. Some of the best known types of collectibles are playing cards and sports trading cards. Because collectibles are, naturally, often valuable, there has developed an industry offering numerous products which can protect collections in a manner that is considered at the same time both professional and inexpensive. However, the concept of "protection" within this industry is generally considered synonymous with "storage." The majority of protective means and devices that have been made available to consumers for their collections, whether expensive or inexpensive, have been designed to protect items in secured, non-readily-visible storage. The emphasis on protection has not, to the contrary, been geared towards providing for the showcasing of collectibles for easy viewing on a wall, for example, the way that posters and artwork are typically displayed. Collection holders/protectors, ranging from cheap to expensive, are most commonly designed with the intention that collectible items will be stored in drawers, closets or safes. In the event that actual display of a collection is desired, a collector will usually go to a professional frame-maker and make a large financial investment in a display frame ore case.

One of the primary disadvantages of this method, apart from the obvious high cost, is that these usually custom-made display frames and cases most often only showcase a few of the choicest items in a collection. For instance, in the case of a trading card collection, only the most valuable or attractive cards are usually placed under one solid sheet of glass or protective-coated translucent plastic and these can not easily be re-arranged without taking apart the professionally made frame/case, which is characteristically not designed to be opened.

While it is true that some inexpensive card display systems do exist in the form of transparent vinyl sheets having pockets to hold cards, these have distinct disadvantages as they: a) entirely encase, and therefore cover, the card making viewing of the card less aesthetically pleasing; b) limit to a pre-determined and fixed number (usually 9, 12, or 16) the number of cards that can be inserted into the sheet pockets; c) are not designed to form an attractive, inter-linking display of the pockets which would permit an entire, large collection to be showcased in a professional manner; d) are fixed in size, which means that: in the instance when a card is much smaller than the pocket size, these sheets offer an unattractive display, and in the instance when the card is even just slightly larger than the pockets, the sheets become entirely useless. Such card display sheets, moreover, are generally entirely unsuited to displaying other collectibles, such as photographs, since conventional sizing of trading cards and, for instance, photographs, is different.

The primary alternate option for displaying cards and photographs, is the traditional push-pin/thumbtack & cork bulletin-board method. Yet another display alternative is the traditional affixing of tape or supposedly "removable" poster tack/gum to the card or photograph which subsequently gets applied directly onto a wall. Most collectors find these methods to be bad for both the wall and/or for the display items themselves. Magnets are also relied upon to hold display items, but their use is almost exclusively confined to refrigerators or magnetically-painted walls. Magnets have the disadvantage that they cover a portion of the image in an unsightly manner. The same is true for another method which has gained slightly in popularity during the past decade—but only slightly—that being a rigid-backed board in conjunction with criss-crossing ribbons into which, typically, photographs are displayed. The disadvantages of covering a portion of the display item is significant since important information may be obscured.

None of the prior art recognizes the need to solve the problem of displaying multiple items, potentially items of differing sizes, and particularly, of displaying multiple items in a manner that does not significantly limit the number of display items; none of the prior art discloses integrally molding an increased slope to increase tension useful towards increasing the holding pressure exerted on display item(s); none of the prior art discloses the advantage of having a transparent upper plate to provide an unobscured view of the display item(s); obviously, the application of prior art towards multi-item displays has never been conceived of prior to the object of this invention, otherwise its commercial success already would have been established.

In U.S. Pat. No. 6,018,849 to ROYER, an improved device for grasping and holding together a group of papers is disclosed which is specifically designed for holding together a group of papers in the manner of a traditional paper clip. This clip offers on one sole section for grasping papers. Moreover, one of the objects indicates that Royer was only addressing his device towards groups of papers and the need to have the edges of the papers aligned flush to each other, on top of another. An object of the subject invention states that it is to provide an improved device for grasping together otherwise loose papers in a manner so that the sides and top of edges of paper members are substantially aligned and even with one another. Royer does not justify the reasoning behind which such an effect is desirable, but it may be inferred that the application of the object of this invention was not for display. The reason for this inference is that most often papers grouped together are for storage, which only makes sense since any papers following the top sheet are not usually visible.

U.S. Pat. No. 5,179,765 to SUNGBERG discloses the concept of a paper clip as a key ring item. Considering that few people typically walk around holding their keys with papers dangling for their key ring, and further, considering that even one or two keys would be too heavy for the pressure of the clip to maintain its contact with papers to which the keys and clip would be attached, this invention seems particularly impractical. As a per-clipping item separate and apart from its use in coordination with a key-ring concept, this clip notion is entirely obvious to one skilled in the art.

U.S. Pat. No. 5,544,436 to LEFKOWITZ discloses an apparatus for simultaneously displaying a plurality of photographs, pictures, cards, and the like. However, as is typical of prior art in this field, the number of display panels are fixed in a relatively expensive frame.

U.S. Pat. No. 6,490,818 to BRAMHALL discloses a frame having moveably sliding "carriers" which slide within a framework. The number of display panels, in this prior art invention are fixed in a relatively expensive frame.

There is a need for an inexpensively produced device which can display items including, but not limited to, trading cards, playing cards or photographs, electronic viewscreens, or most any other type of relatively thin item to be displayed in an attractive manner; one which can accommodate virtually any size display item, and that can hold a potentially limitless number of display items without damaging the items in ways that push pins/thumb tacks and tape do, and also which will not obscure the item being held. In addition, there is a need for a device/system which requires only basic instructions in order for it to be easily used.

These and other objects and advantages of the invention will become more apparent from the following detailed description and claims.

SUMMARY AND OBJECTS OF THE INVENTION

The present invention is a device/system which provides for the easy and inexpensive displaying of items such as, but not limited to, artwork, trading cards, photographs and electronic viewscreens. An object of this invention is to provide a device/system which is/are simple and inexpensive to manufacture.

Another object of this invention is to provide a simple-to-use device/system requiring little training to use, yet which still affords a uniform, professional display appearance, paramount among which is the characteristic that the display items are aligned to one another by means of an alignment guide.

Yet another object of the present invention is to provide a device/display system which permits substantially the entire image of the item(s) being displayed to be seen. One means of achieving this result is through the use of a transparent holding element which affords an unobscured view of the display item being held.

Yet still another, further object of this invention is to provide for the potentially unlimited number of display items to be interconnected.

A still further, additional object of this invention is to provide a display device which can be "set-up" and taken down relatively easily and quickly and which may be easily transported.

A yet still further object of this invention is to provide a display system which can be relatively easily secured to a wall or other such display area without damage to item or wall.

DESCRIPTION OF THE PREFERRED EMBODIMENT

Figure 1:
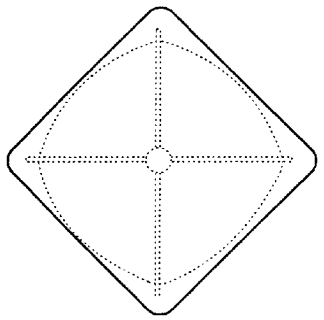
FIG. 1 is a view of a rectangular embodiment with four "gripping" areas and center tack hole.
Figure 2:
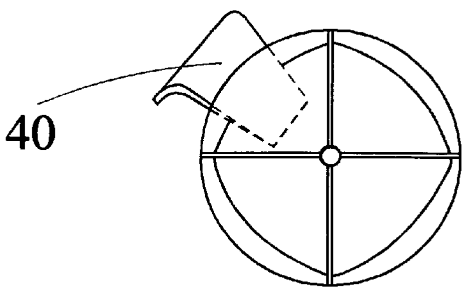
FIG. 2 is a view of a circular embodiment with four "gripping" areas and center tack hole, and insertable grip-enhancing aid having broken lines to indicate that it is slipped inside.
Figure 3:
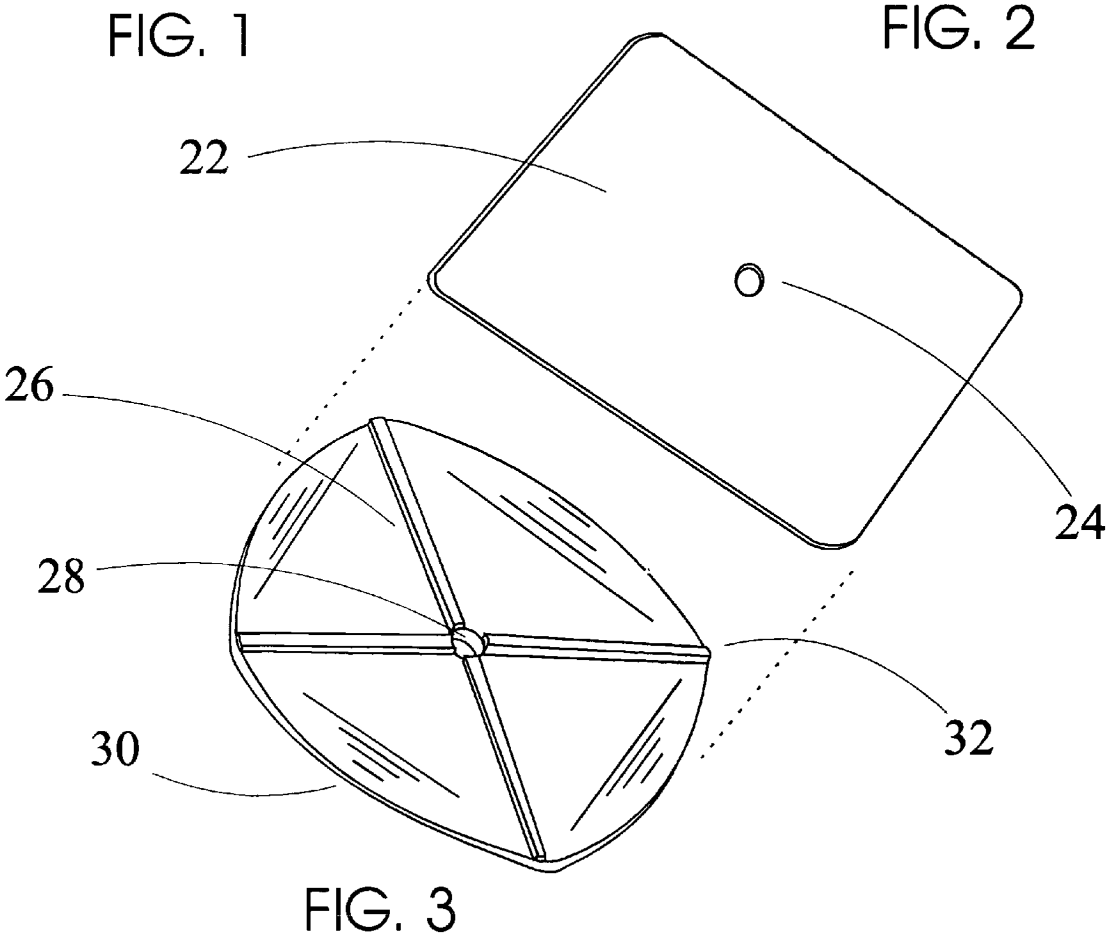
FIG. 3 is a detailed view of a rectangular embodiment showing two separated plates, four "gripping" areas, and a center tack hole.
Figure 4:
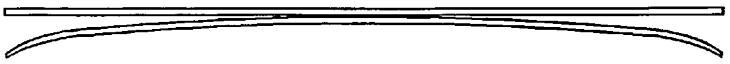
FIG. 4 is a side view indicating how the preferred embodiment of the invention of this disclosure employs two "plates" which are centrally connected, with the anterior plate angled and having rounded edges providing for the easy insertion between it for a display item.
Figure 5:
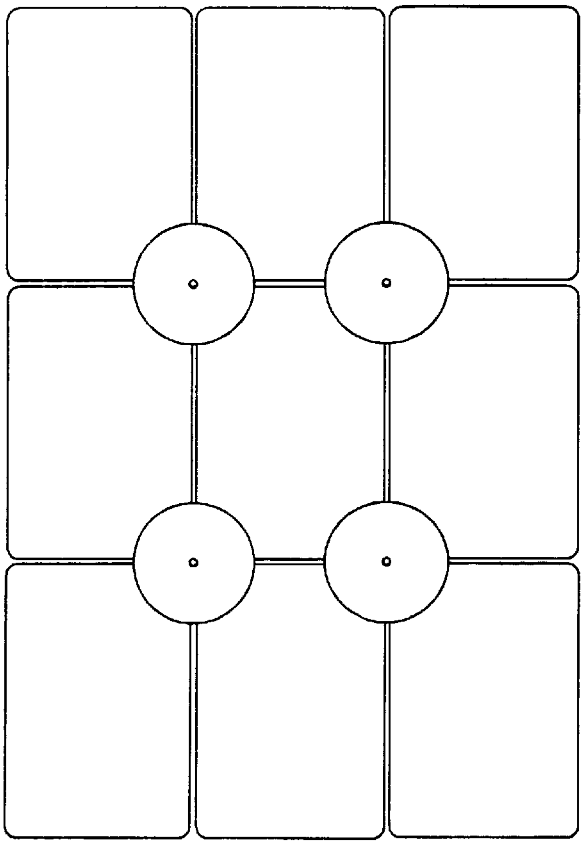
FIG. 5 is an overview frontal view of how an embodiment of this invention may be used.
Figure 6:
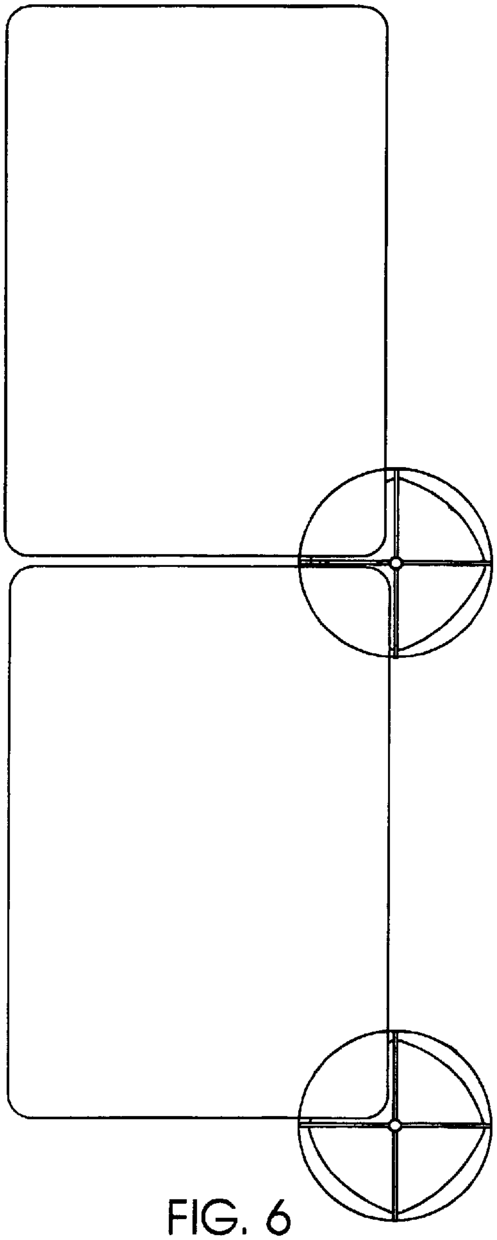
FIG. 6 is a view indicating how an essentially flat display item can be gripped.
Figure 7:
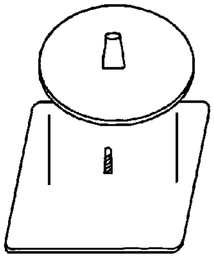
FIG. 7 is a separated view of two pieces which fit together using a helix formation and which become closer together through a rotational tightening process.
Figure 8:
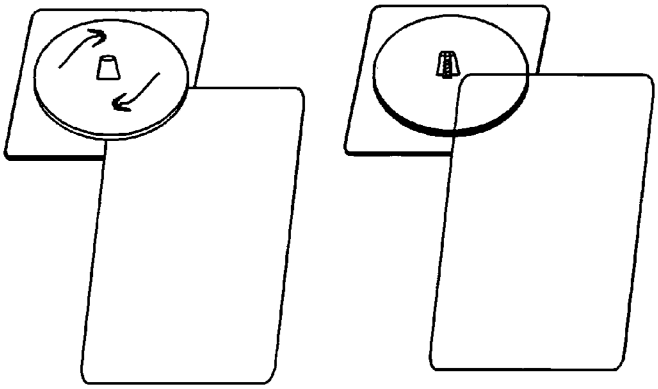
FIG. 8 are views of how a display item may be inserted and held in place in a manner in which the card may be visible through transparent material holding it.
Figure 9:
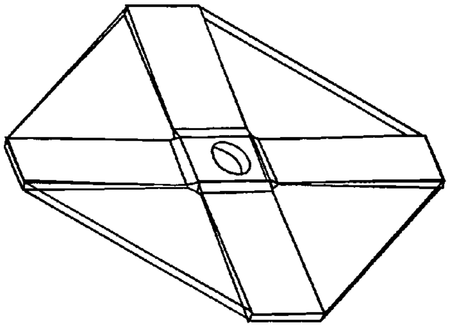
FIG. 9 discloses a device with four interior spaces to accommodate card insertions which tapers-off at the center making the fit tighter, thereby enhancing the grip action.
Figure 10:
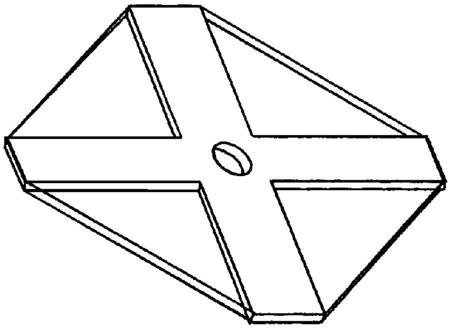
FIG. 10 discloses a device with four interior spaces to accommodate the insertion of display items and a tack hole having smooth, perpendicular interior sides to guide display item insertions.
Figure 11:
FIG. 11 is a side view of another embodiment disclosing flanking display items being held.
Figure 12:
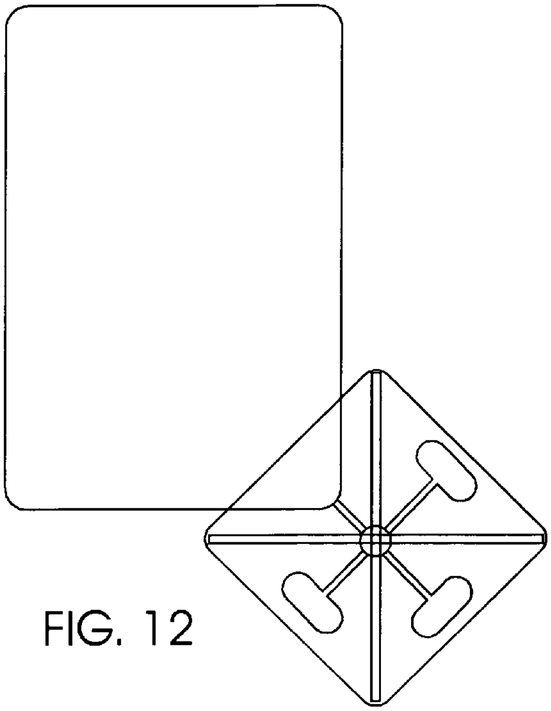
FIG. 12 is a view of another embodiment shown holding a display item.
Figure 13:
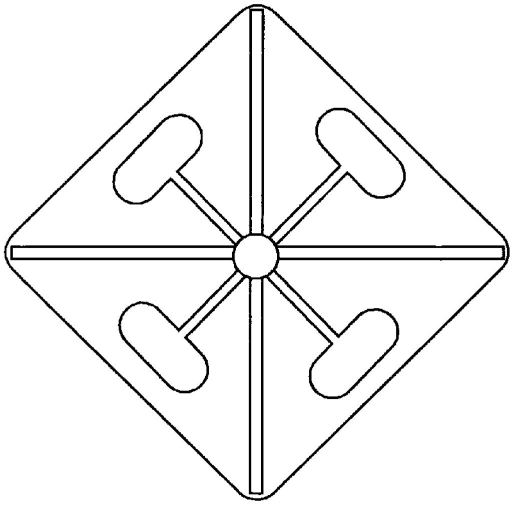
FIG. 13 is a view shown without a display item being held.
Figure 14:
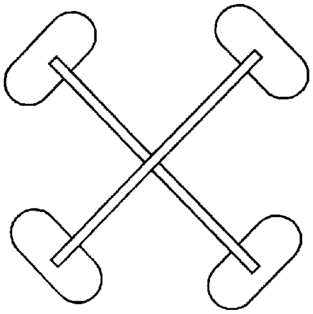
FIG. 14 is an underneath view of the back of an embodiment without a tack hole.
Figure 15:
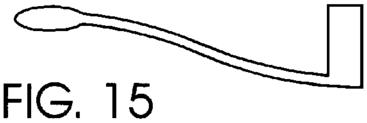
FIG. 15 is a side view of an embodiment's "pressure arm" alone.
Figure 16:
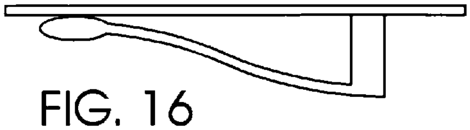
FIG. 16 is a side view of an embodiment's "pressure arm" as it contacts the holder portion.
Figure 17:
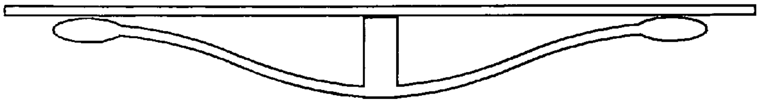
FIG. 17 is a fuller side view of an embodiment.
Figure 18:
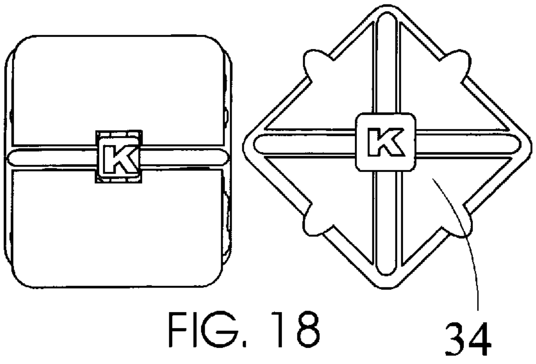
FIG. 18 discloses two top views of embodiments having "re-positionably sticky" areas and shows two different options for removable "sheeting", and each has a primarily anterior "plate" with only a minor "front" plate which forms a "shelf" for holding display items and keeping them aligned.
Figure 19:
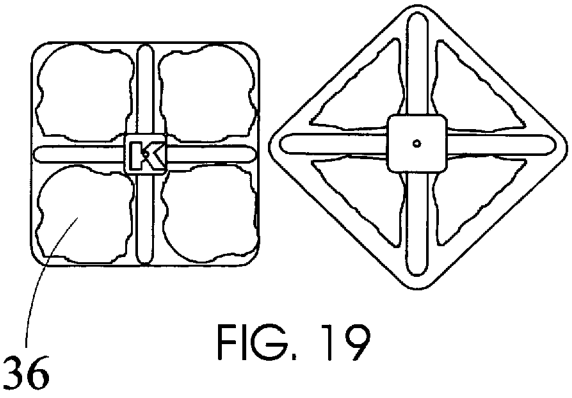
FIG. 19 discloses two top views of embodiments having "re-positionably sticky" areas with the removable "sheeting" removed.
Figure 20:
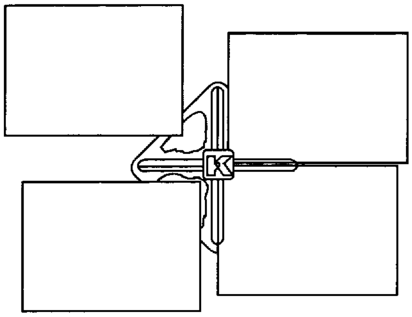
FIG. 20 is a top view showing the process of how display items are precisely aligned to each other using the device of this invention.
Figure 21:
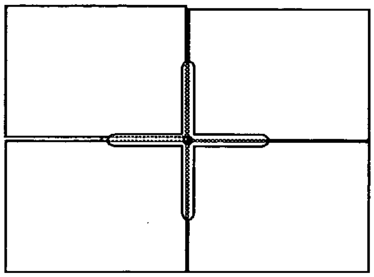
FIG. 21 a top view of display items held by the device of this invention.
Figure 22:
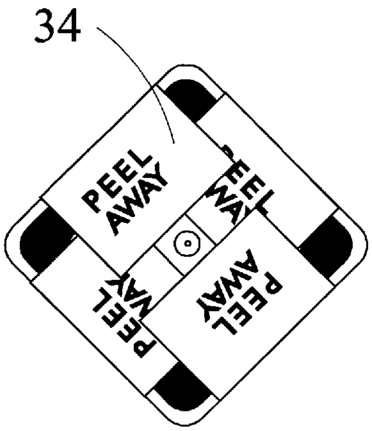
FIG. 22 is an anterior view of single or double-sided sticky area(s) to affix to a wall.
Figure 23:
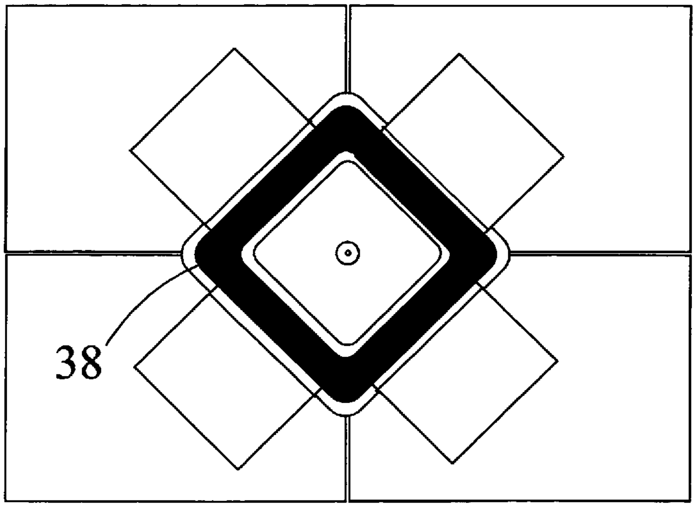
FIG. 23 is an anterior view of single or double-sided sticky area(s) in contact with display items and disclosing a magnet for affixing to a metallic painted or metallic wall or refrigerator.
Figure 24:
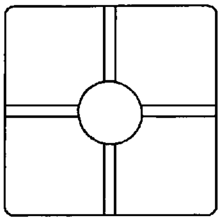
FIG. 24 is a top view of a spring-loaded embodiment.
Figure 25:
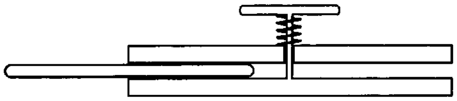
FIG. 25 is a side view of a spring-loaded embodiment open and being loaded.
Figure 26:
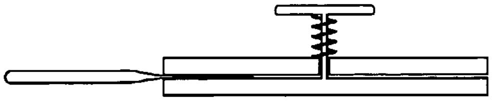
FIG. 26 is a side view of a spring-loaded embodiment being loaded an closing.
Figure 27:
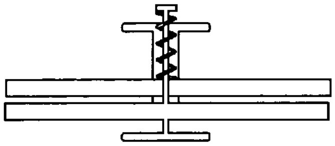
FIG. 27 is a side view of a spring-loaded embodiment closed, with interior spring.
Figure 28:
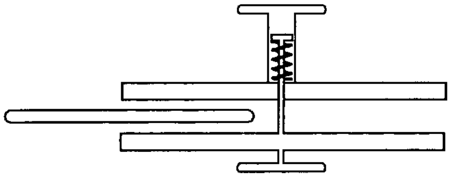
FIG. 28 is a side view of a spring-loaded embodiment open with interior spring and display item.
Figure 29:
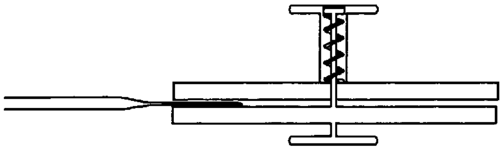
FIG. 29 is a side view of a spring-loaded embodiment closed with interior spring and display item.
Figure 30:
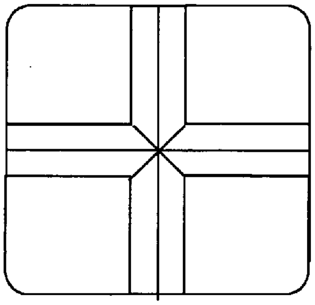
FIG. 30 is a top view of an embodiment.
Figure 31:
FIG. 31 is a side view showing an embodiment that tapers.
Figure 32:
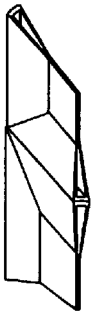
FIG. 32 is more of an exploded view showing an embodiment that tapers.
Figure 33:
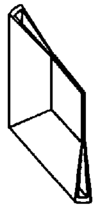
FIG. 33 is more of an exploded view showing an embodiment that tapers.
Figure 34:
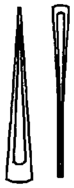
FIG. 34 is a side view of the embodiment of FIG. 30.
Figure 36:
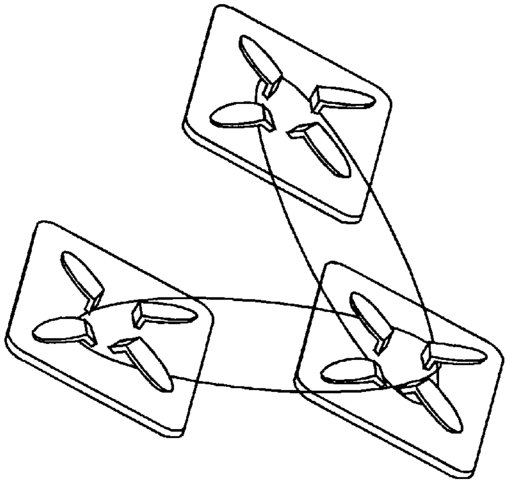
FIG. 36 is an anterior view of another method for holding a device together slightly differently by string or rubberbands.
Figure 35:
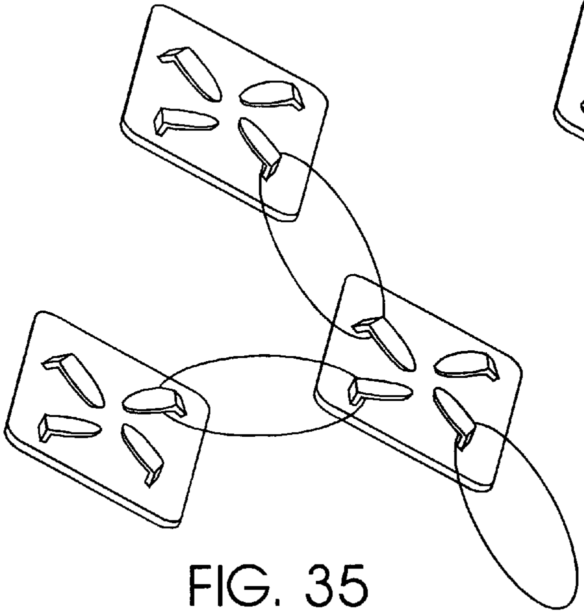
FIG. 35 is an anterior view of one method for holding a device together slightly differently by string or rubberbands.
Figure 37:
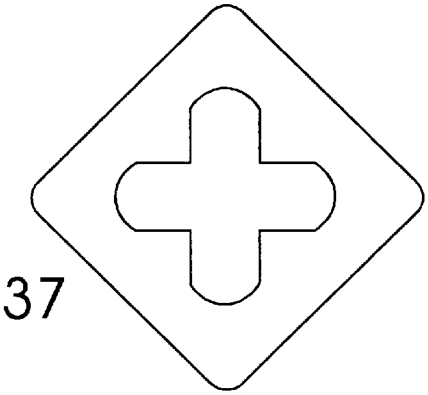
FIG. 37 is a frontal view of the embodiment of FIG. 35.
Figure 38:
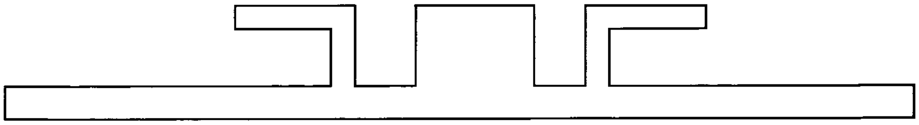
FIG. 38 is a side view of the embodiment of FIG. 35.
Figure 39:
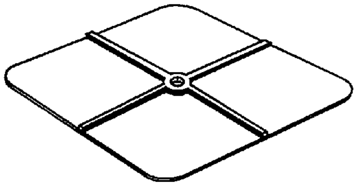
FIG. 39 is a perspective view of an anterior plate with a smooth surface.
Figure 42:
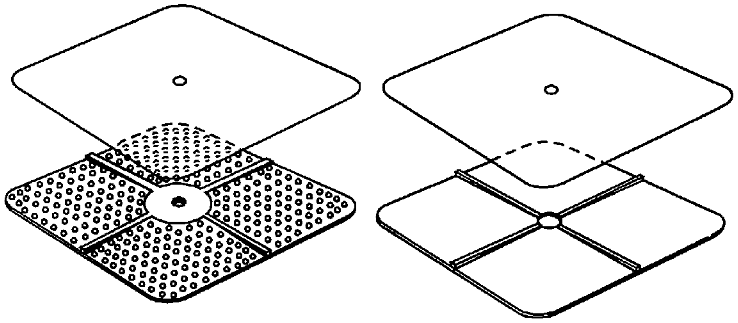
FIG. 42 are perspective views of a devices with texturized and smooth anterior plates with sloping gradations & tack holes.
Figure 40:
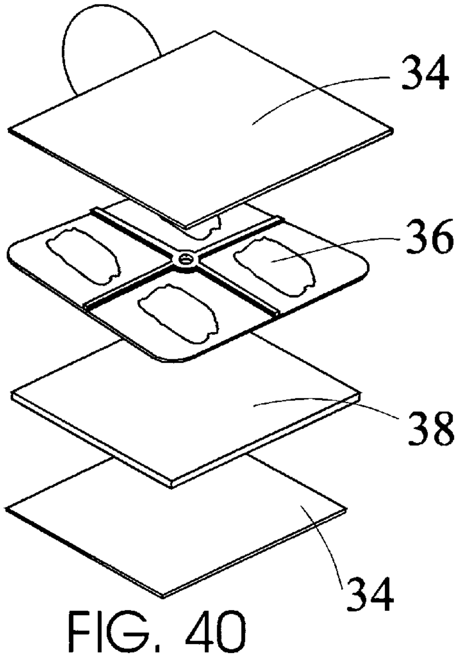
FIG. 40 is a layered, perspective view of a "sticky faced" frontal plate with peel away cover sheet and magnet on its reverse side and a peel-away sticky sheet on the magnet.
Figure 43:
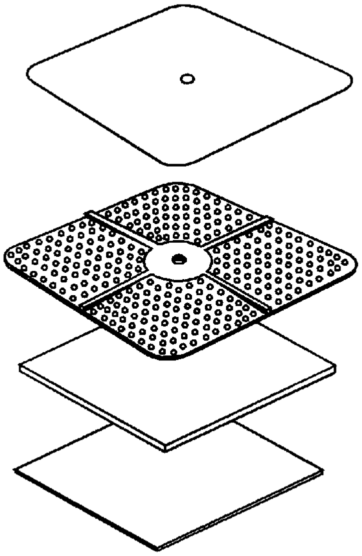
FIG. 43 is a perspective view a sloping anterior plate with magnet and sticky back.
Figure 41:
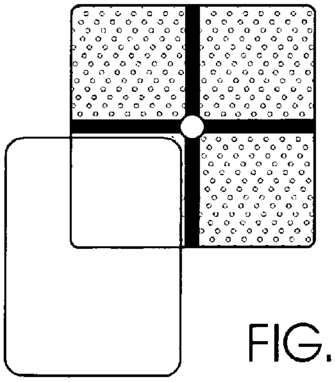
FIG. 41 is a top view of a transparent frontal plate, and a textured face of an anterior plate.
Figure 44:
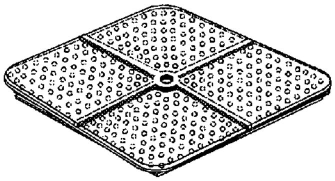
FIG. 44 is a perspective view of the layers when in a final, assembled device.
Figure 45:
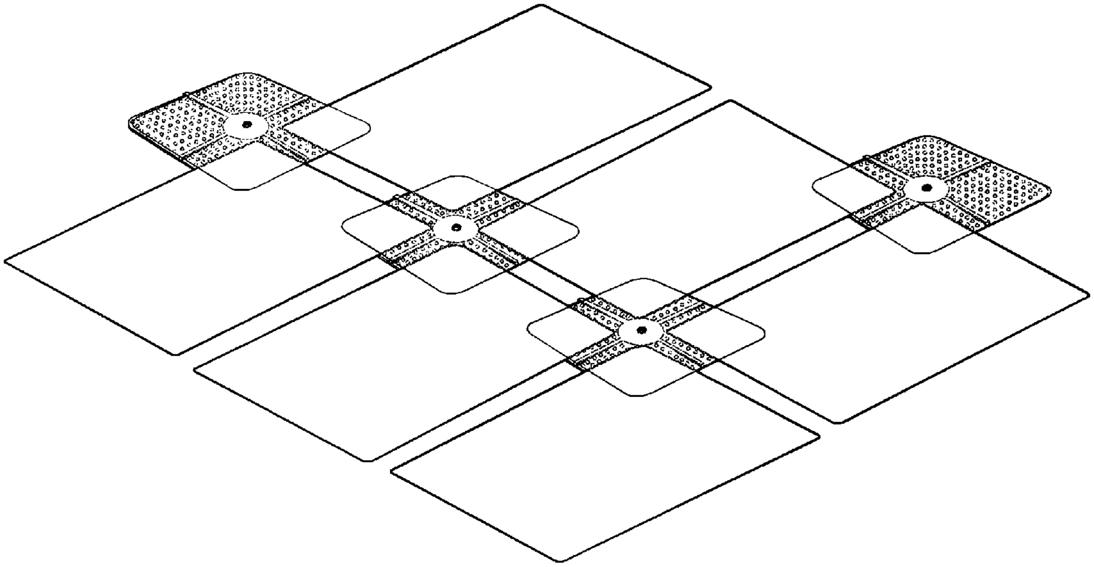
FIG. 45 is a perspective view of an embodiment of this invention holding card-like items.
Figure 46:
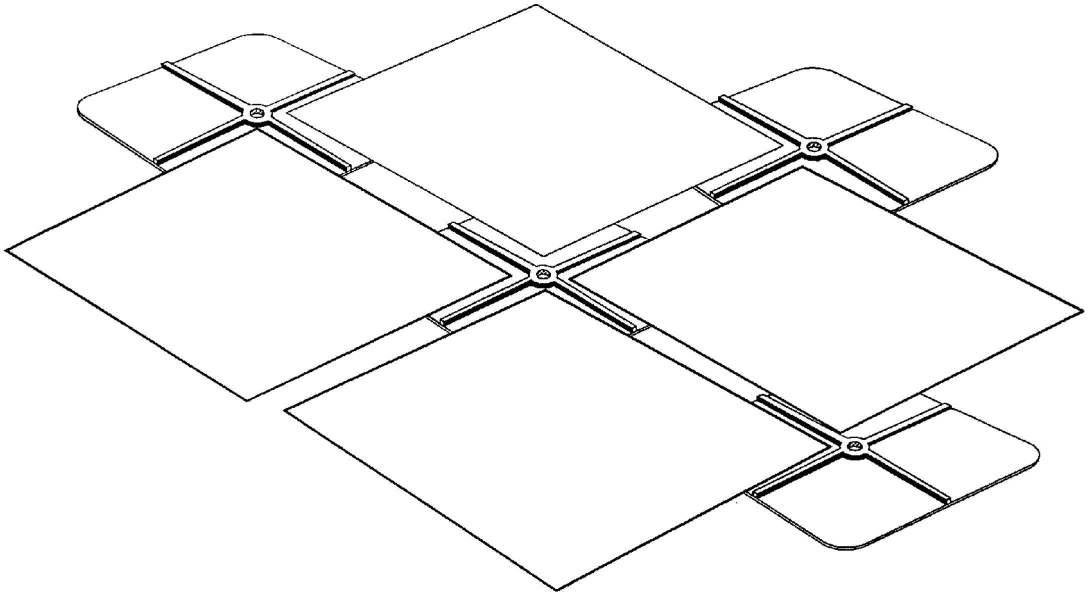
FIG. 46 is a perspective view of an embodiment of this invention holding card-like items.
Figure 47:
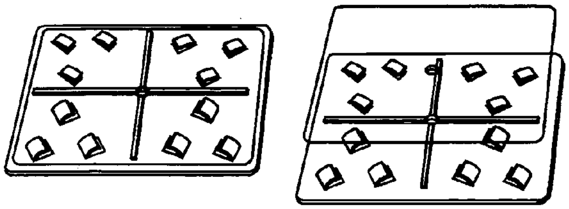
FIG. 47 is a perspective view of another embodiment of this device.
Figure 48:
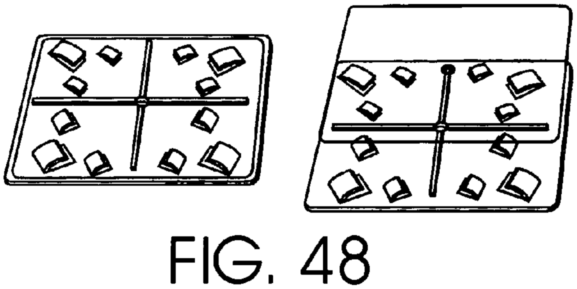
FIG. 48 is a perspective view of another embodiment of this device.
Figure 49:
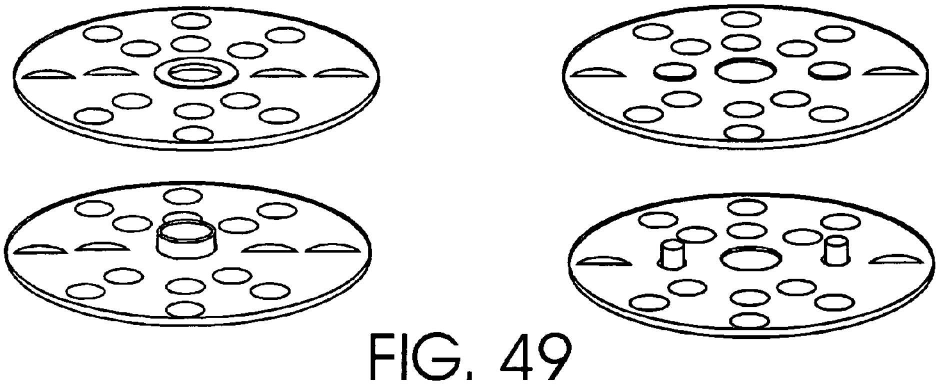
FIG. 49 is a perspective view of yet another embodiment permitting the joining of a front and back plate at a hub without glue or sonic welding.
Figure 50:
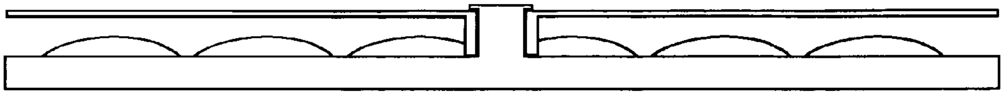
FIG. 50 is a perspective view of the embodiment of FIG. 49 uniting the two plates at the center by pushing down on the protruding center of the anterior plate.
Figure 51:
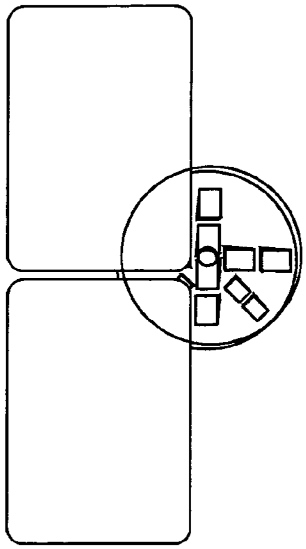
FIG. 51 is a frontal view of two devices showing how the embodiment of FIG. 48 may be used.
Figure 52:
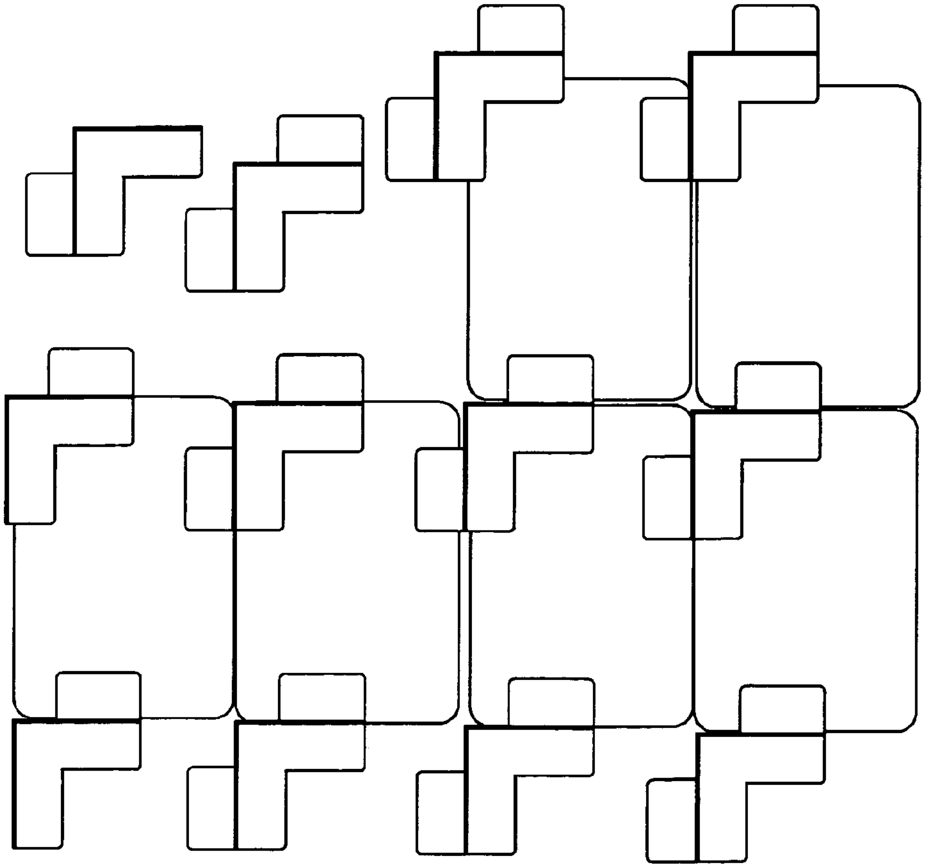
FIG. 52 yet another embodiment means for holding flat items in which the top and/or side holders can be broken away to form a clean edge.
Figure 53:
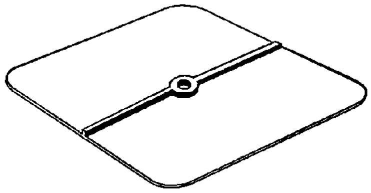
FIG. 53 is a perspective view of a back plate of clamp-like clip with a tack hole.
Figure 54:
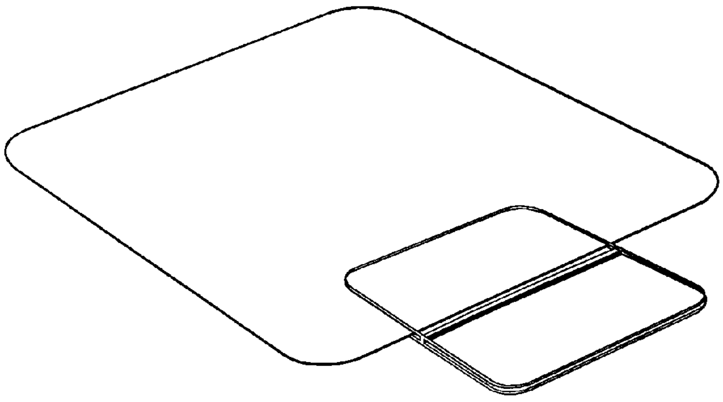
FIG. 54 is the embodiment of FIG. 53 without tack hole and holding a card-like display item.
Figure 55:
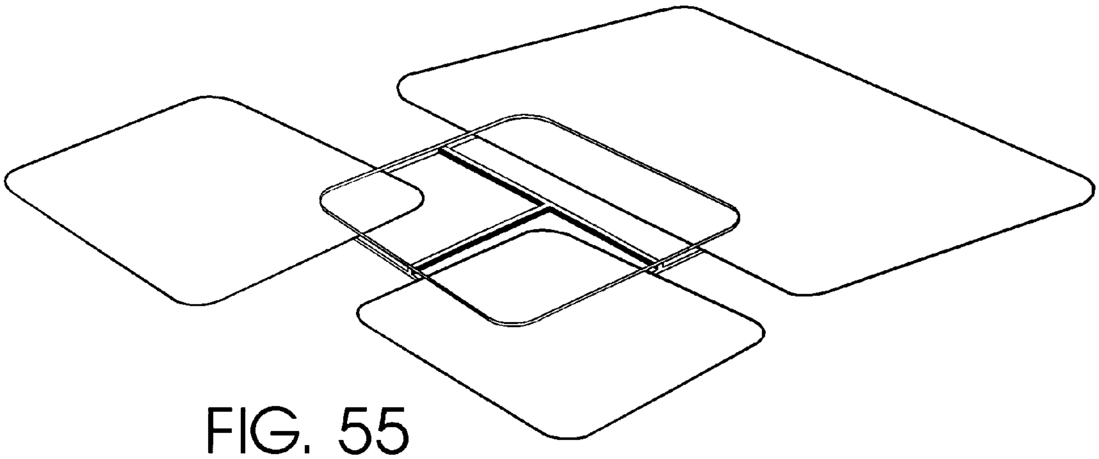
FIG. 55 is a perspective view of an embodiment holding three card-like items.
Figure 56:
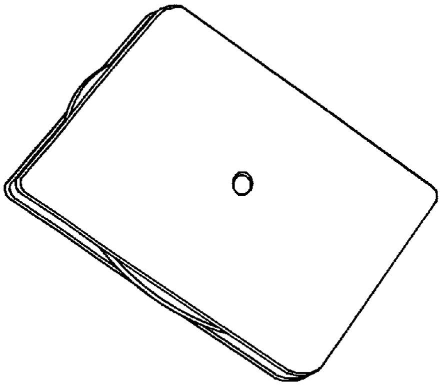
FIG. 56 is yet another perspective view of an embodiment for holding card-like items back-to-back.
Figure 57:
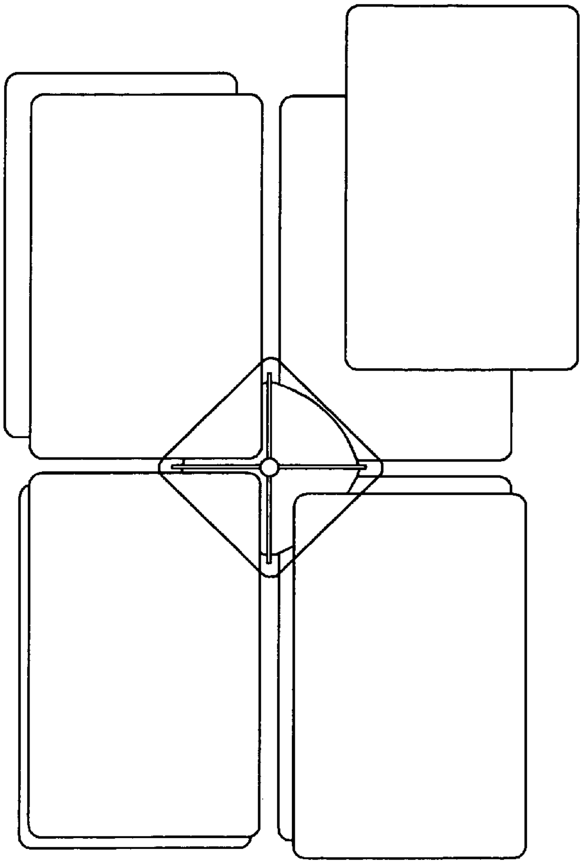
FIG. 57 is a side view of an embodiment holding card-like items back-to-back.
Figure 58:
FIG. 58 is a side view of FIG. 56 for holding card-like items back-to-back.

| | |
|---|---|
| Front Plate 22 | Back Plate Tack Hole 28 |
| Tack Hole 24 | Tapered Edge 30 |
| Back Plate 26 | Raised Guide Edge 32 |

In a preferred embodiment, the front plate 22, is formed of a transparent, entirely flat, planar sheet of a colorless plastic. This provides for a viewer to see through front plate 22 to the display item(s) which can have little, if any, of its area otherwise obscured. Back Plate 26 can be made of most any type of material, but is preferably of the same material as that of the Front Plate 22 to offer Back Plate 26 a superior bond with Front Plate 22. A central a hole, Tack Hole 24, is made, for instance, through an integral injection-molding process, or it may be drilled or made with a tool with an industrial steel pointed pin. Tack Hole 24 should be wide enough to easily accommodate the insertion of a traditionally sized thumbtack. Tack Hole 24 may be obviated, if so desired, in other embodiments in which, for example, the center area of the device may display a stamped/embossed/etched/imprinted corporate and/or brand logo.

If the invention of this device is to be manufactured through an injection molding process, prior to molding or extruding the device of this invention, a traditional, common, conventional plastic pelletized resin is obtained. One simple means for joining Front Plate 22 and Back Plate 26 is through the production process using sonic welding. Those skilled in the art of plastic injection molding and plastic assembly are already aware that this process, in which two separate pieces of plastic are integrally bonded wherever they touch, provides for an extremely fast, strong, and cost effective means for joining two pieces of plastic. This manner permits a relatively strong bonding of two separate pieces of plastic without the use of glue. Of course, glue may also be used as an alternative to joining two pieces of plastic.

Back Plate 26, preferably, has Tapered Edge 30 to allow for the more easy insertion of display items. Raised Guide Edge 32 serves to create an "envelope" effect in-between the two sandwiching Front and Back Plates 22 and 26, thereby creating a space suitable to accommodate the insertion in-between of display items. Raised Guide Edge 32, further, serves as the joining points of between Front and Back Plates 22 and 26 in the sonic weld joining process, in that Front and Back Plates 22 and 26 only meld together along the points at which they touch, which are along the "crossed" Raised Guide Edge 32.

While the preferred embodiment of the present invention has been described and illustrated, it is understood by one skilled in the art that the preferred embodiment is capable of variation, addition, omission and modification without departing from the spirit and scope of the invention.

What is claimed is:

1. A device capable of holding a plurality of items for display, comprising:

a front substantially planar member having a front exterior surface and a back interior surface;

a back substantially planar member having a front interior surface and a back exterior surface;

on a surface of at least one planar member, being at least two substantially straight, smooth and linear, raised, co-planar ribs having a pre-determined thickness and lying at 90-degree right angles in perpendicular relation to each other, thereby forming a cross-shaped configuration having a central hub and extending radially outward therefrom;

means for joining said front and back substantially planar members wherein said substantially straight and smooth, linear, raised, co-planar ribs are located therebetween, thereby defining multiple spatial cavities suitable for the introduction thereinto of at least one display item, and so that an interiorly directed pressure between said front and back substantially planar members is exerted on said at least one display item therein.

2. The device capable of holding a plurality of items for display according to claim 1, wherein:

the front substantially planar member is made of plastic;

the back substantially planar member is made of plastic;

said substantially straight, smooth and linear, raised co-planar ribs are separate, from said front and back substantially planar members;

said means for joining said front and back substantially planar members is sonic welding;

said central hub has a hole;

said front and back substantially planar members is an at least partial texturing of the plastic surface on at least one of said substantially planar members, wherein said partially textured surface is positioned to form part of the interior of said defined spatial cavity.

3. A device capable of holding a plurality of items for display, comprising:

a front substantially planar member having a front exterior surface and a back interior surface made of plastic;

a back substantially planar member having a front interior surface and a back exterior surface made of plastic;

integrally molded into at least one of the substantially planar members, there being at least two substantially straight, smooth and linear, raised, co-planar ribs having a predetermined thickness and lying at 90-degree right angles in perpendicular relation to each other, thereby forming a cross-shaped configuration having a central hub and extending radially outward therefrom;

means for joining said front and back substantially planar members using sonic welding, whereby said substantially straight and smooth, linear, raised, co-planar ribs are located between said front and back substantially planar members, thereby defining multiple spatial cavities suitable for the introduction thereinto of at least one display item; and means for the exertion of an interiorly directed pressure between said front and back substantially planar members is provided by a gradient surface having the exterior edge of at least one of the substantially planar members forming the lower edge of the gradient surface, wherein said gradient surface is positioned to form part of the interior of said defined spatial cavity.

4. A device capable of holding a plurality of items for display, comprising:

a front substantially planar member having a front exterior surface and a back interior surface made of translucent plastic;

a back substantially planar member having a front interior surface and a back exterior surface made of plastic;

on a surface of at least one planar member, there being at least two substantially straight, smooth and linear, raised, co-planar ribs having a predetermined thickness and lying at 90-degree right angles in perpendicular relation to each other, thereby forming a cross-shaped configuration having a central hub and extending radially outward therefrom, wherein said central hub has a hole;

means for joining said front and back substantially planar members wherein said substantially straight and smooth, linear, raised, co-planar ribs are located therebetween, thereby defining multiple spatial cavities suitable for the introduction thereinto of at least one display item, and so that an interiorly directed pressure between said front and back substantially planar members is exerted on said at least one display item therein; and said exterior surface of said back substantially planar member having a magnet element.

* * * * *